United States Patent [19]
Simmons et al.

[11] 3,716,387
[45] Feb. 13, 1973

[54] CEMENT CLINKER PRODUCTION

[75] Inventors: Kenneth D. Simmons, New Canaan, Conn.; Henry W. Allen, Saverna Park; Ronald F. Gebhardt, Randallstown, both of Md.; Hoke M. Garrett, Piedmont, Calif.

[22] Filed: Dec. 16, 1970

[21] Appl. No.: 98,614

[52] U.S. Cl. .....................106/100, 106/103, 263/53
[51] Int. Cl. ...............................................C04b 7/28
[58] Field of Search ..................106/100, 103; 263/53

[56] References Cited

UNITED STATES PATENTS

| | | | |
|---|---|---|---|
| 3,135,618 | 6/1964 | Friese et al. | 106/100 |
| 3,127,455 | 3/1964 | Culbertson et al. | 106/100 |
| 2,904,445 | 9/1959 | Sellers et al. | 106/100 |
| 2,793,958 | 5/1957 | Hetzel | 106/100 |
| 2,592,468 | 4/1952 | Rex et al. | 106/100 |

*Primary Examiner*—Winston A. Douglas
*Assistant Examiner*—W. T. Scott
*Attorney*—John A. Crowley, Jr. and Alvin H. Fritschler

[57] ABSTRACT

Calcareous rock having an appreciable kerogen content, forming up to 75 percent of kerogen-bearing limestone deposits and previously unsuited for use in cement producing operations, is roasted at 800°–1,600 °F, preferably at 1,000°–1,350° F, in an oxidizing atmosphere to reduce the kerogen content to tolerable levels and render the roasted rock suitable as kiln feed material for cement production operations. The entire kerogen-containing limestone deposit can thereby be effectively utilized in such operations.

The quality of the roasted rock as kiln feed material is enhanced by the entrainment of impurities in the air stream used to cool the roasted rock, in the roaster effluent gases and in the heated gas stream used for drying of the rock prior to roasting. The effluent gases from the roaster and heated air from the cooling zone can be employed for the drying of additional quantities of rock. By carrying out the primary crushing of the rock so as to minimize the production of limestone fines, thus minimizing the amount of limestone material removed from the treated rock with the impurity-laden fines entrained in said gas streams, the quality of the treated rock may be further enhanced. With raw rock from interbedded deposits having thin bands of limestone separated by thin bands of shale, a single roll crusher can be used to minimize the production of limestone fines. Sulfur is removed from the roasted rock without release of sulfur-containing gases to the atmosphere, such removal being enhanced at temperature above 1,000°F. At such temperatures, the kerogen content of the roasted rock is reduced to from about 0.8 to 1.5 percent by weight of rock. In the effective utilization of limestone deposits having both high quality rock with tolerable amounts of hydrocarbons and said rock with appreciable kerogen hydrocarbon content, the high kerogen material, previously unused, can be employed for about 50 to 90 percent of the calcareous material used in cement clinker production, thereby avoiding premature depletion of the high quality rock and assuring effective utilization of the entire deposit.

47 Claims, 2 Drawing Figures

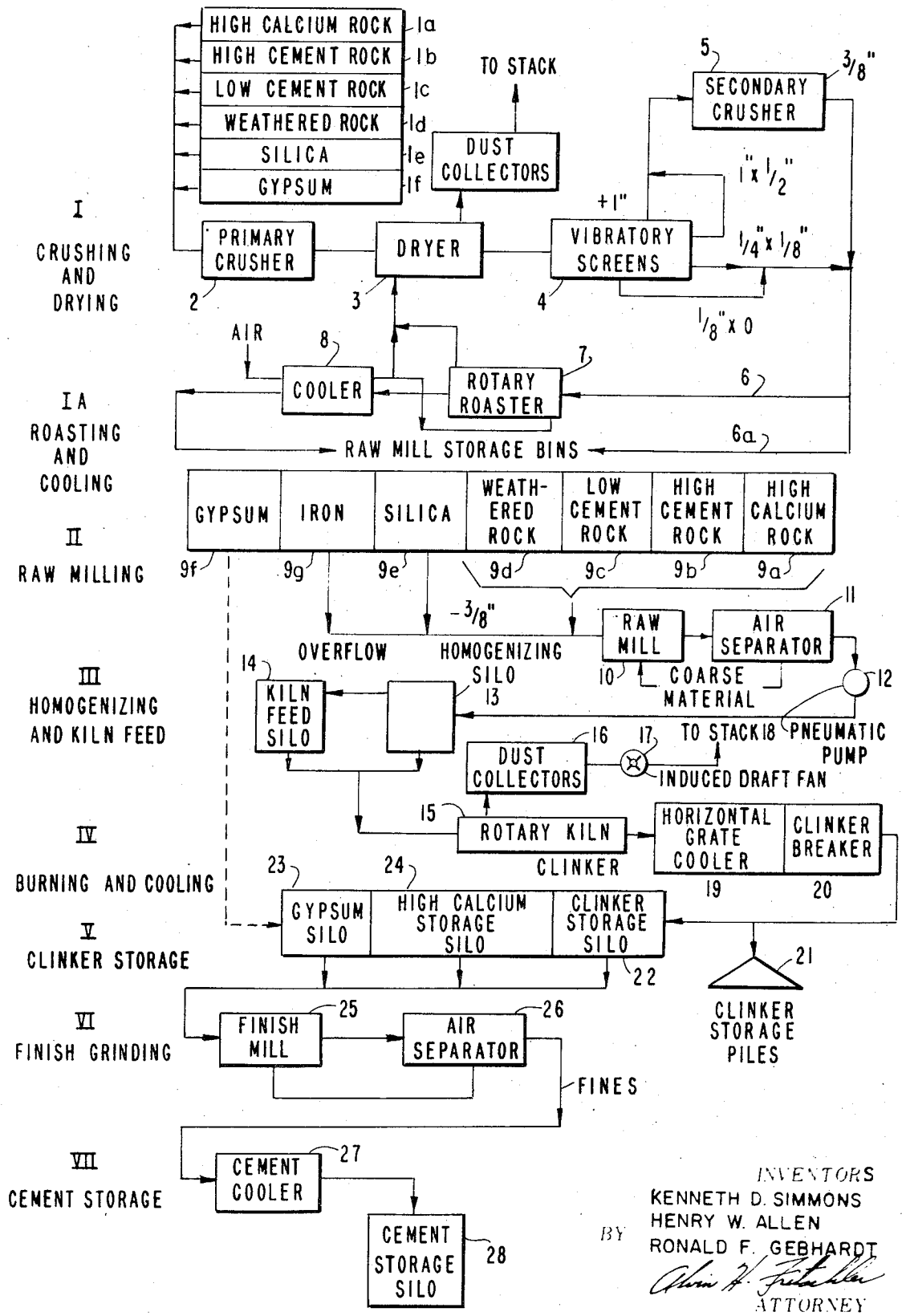

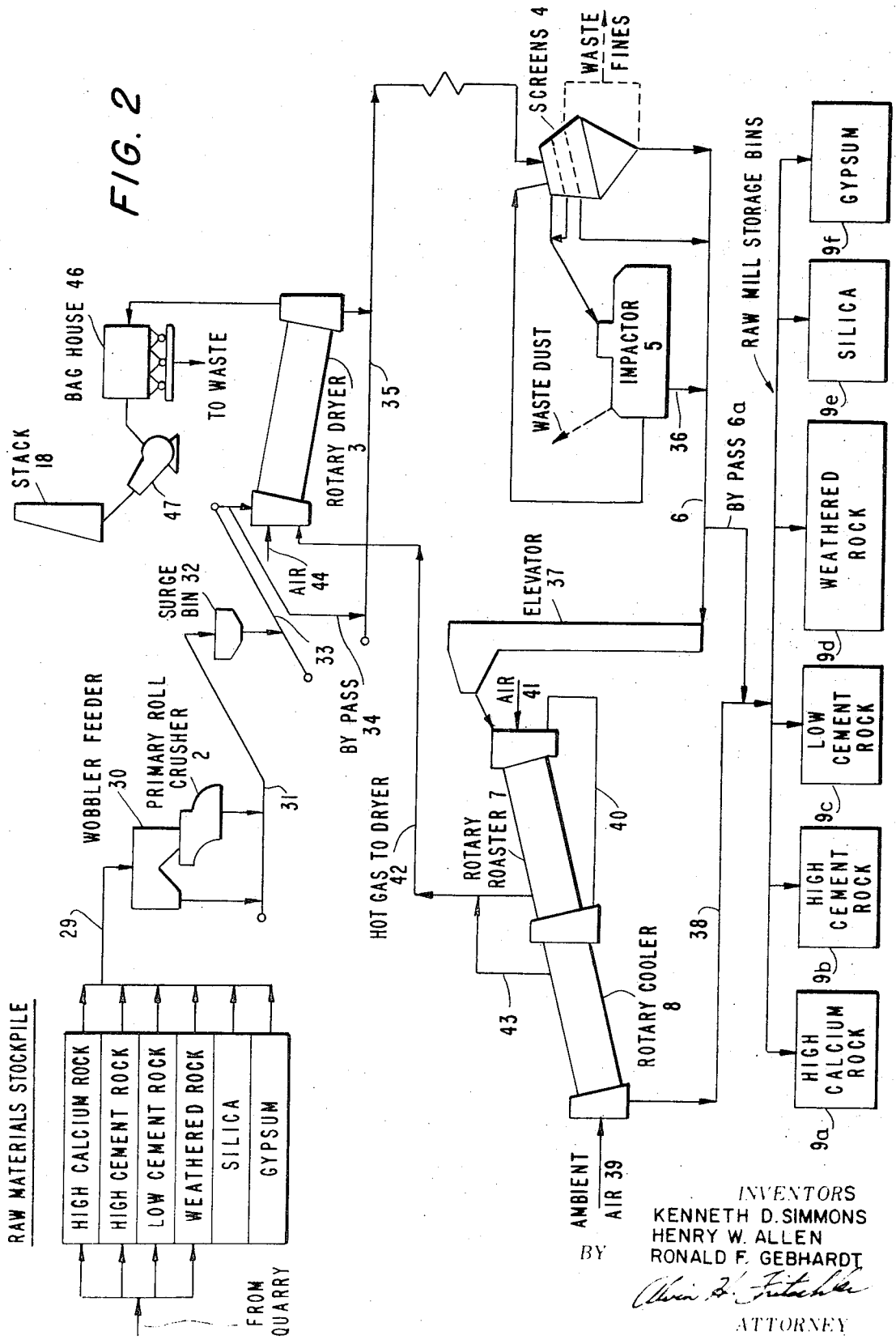

CEMENT CLINKER PRODUCTION

BACKGROUND OF THE INVENTION

1. Field of the Invention

This invention relates to the production of cement clinker and related cement products. More particularly, it relates to the effective utilization of kerogen-containing calcareous material in the production of cement clinker.

2. Description of the Prior Art

Cement clinker is commonly produced by burning calcareous material with iron and silica at temperatures on the order of 2,600°–2,800°F to cause incipient fusion of the ingredients. Considerable attention has been given to this burning operation over the years, especially with respect to the use of low grade materials that will supply non-calcareous, inorganic raw materials desirable in the production of cement clinker and, in addition, all or a part of the fuel required to sustain the burning operation. For example, Lesley, U.S. Pat. No. 1,323,294, discloses distilling low grade carboniferous material, i.e., oil shale, lignite and low grade coal, to separate volatile components thereof from non-volatile fixed carbon and a relatively large proportion of ash or non-combustible residue. The non-volatile components, together with calcareous material from an independent source of supply and other cement raw materials, are subjected to a clinkering process. In this process, the fixed carbon accompanying the residue supplies a substantial amount of the fuel required in the combustion process, while the ash or residue combines with the calcareous material to form cement clinker.

Hetzel, U.S. Pat. No. 2,793,958, discloses the use of spent refinery adsorptive clays, containing up to about 30 percent of adsorbed organic material, which clays are normally discarded as a waste product of petroleum refining. In the process of Hetzel, the waste clays are burned in a vertical kiln at 1,400°–1,500°C in admixture with calcareous material, e.g., limestone to produce cement clinker. The adsorptive clays are said to contain all of the necessary inorganic raw materials used in the production of Portland cement but are deficient in calcium oxide or calcium carbonate, necessitating the indicated admixture with an independent supply of calcareous material. The organic material adsorbed on the spent clay is said to be burned in the kiln, thereby furnishing the source of heat necessary for roasting or burning the cement clinker ingredients to the point of incipient fusion with the formation of cement clinkers.

The use of oil shale containing kerogen materials in the manufacture of Portland cement is shown by Sellers, U.S. Pat. No. 2,904,445. After preliminary shale disintegrating operations, the shale is premixed with finely ground calcareous material from independent deposits, and the admixture is charged to a sintering zone, e.g., a shaft kiln, where all or a portion of the combustible kerogen material originally present in the oil shale is burned to supply the heat for subsequent sintering to form cement clinker.

In each of these prior art techniques, the material combining desirable inorganic raw materials and combustible material suitable as fuel is admixed with an independent supply of limestone or other calcareous material. In these and in other operations in which the desired silica and iron are added as separate ingredients rather than as component ingredients of a low grade supply of raw or waste material, the calcium oxide or calcium carbonate material is obtained from calcareous rock deposits by suitable quarrying operations. In some instances, these deposits will contain both high calcium rock and other lower calcium bearing rock containing kerogen type organic bituminous matter in separate quarry sections. In such instances, of course, it would be highly desirable to utilize effectively all of the rock deposit, i.e., both the high grade material and the lower grade, kerogen-containing material, in the production of cement clinker. In practice, however, it has not heretofore been feasible to utilize the lower grade, kerogen-containing materials for the reasons hereinafter set forth. Such lower grade rock containing unacceptable levels of kerogen materials is simply not quarried or is employed in very limited amounts as raw calcareous feed material. As a result, as much as 70 to 75 percent or more of the calcareous material present in the deposit may be discarded or otherwise unused in cement production operations. The raw calcareous feed material must come, therefore, almost exclusively from the high calcium portion of the deposit, in which the kerogen content of the rock is within tolerable limits. This high calcium portion of the deposit, which may comprise only 25–30 percent of the total deposit, must be conventional operations supply at least about 85 percent or more of the total calcareous rock employed as raw material in cement production. The rate of depletion of the high calcium portion of the deposit is thereby rendered significantly higher than would be desired in light of the overall quantity of limestone present in the deposit. Premature exhaustion of the deposit as a source of raw material for cement production operations thereby results despite the existence, as indicated above, of possibly 70–75 percent of the entire deposit in the form of lower calcium, kerogen-containing material.

In addition, the low calcareous rock present in the mixed deposits of the type herein referred to generally do not have a kerogen content sufficiently high to constitute a source of fuel for the clinkering operation, as was the case with the carboniferous materials and clays mentioned above. In typical operations in which calcareous material, silica and iron ore are admixed and burned to form cement clinker, fuel and air is injected into the kiln in amounts such as to provide the necessary heat for decomposition of limestone and the formation of cement clinker, i.e., the calcareous material itself is not a significant factor with respect to the overall fuel requirements in cement clinker production. The hydrocarbon content of such deposits is sufficient, however, to cause undesired coking of the limestone ingredients during burning operations under reducing conditions. In a reducing atmosphere, hydrocarbon cracking occurs as in the retorting of oil shales. A light volatile fraction containing both condensable and non-condensable material is produced in addition to a heavy residue sometimes described as "coke-like." Under reducing conditions, this residue, which is not a desired ingredient of the sintering operation and the resultant cement clinker, is stable even at extreme conditions. Such coking may be avoided by carrying out the sintering operation in the presence of a considerable amount of excess oxygen. This requires the injection of larger amounts of air into the kiln to assure oxidation of kerogens to $CO_2$ and $H_2O$. The higher air flow rates required to maintain oxidizing conditions are accompanied, however, by excessive entrainment of material fines in the kiln exhaust gases and by reduced operating capacity of the kiln. In view of the growing awareness and concern over pollution of the atmosphere, adequate dust collecting equipment must, of course, be provided before exhausting the kiln gases from the stack to the atmosphere. It has been found, however, that the excessive entrainment of fines resulting from the higher air flow rates required to assure an excess of oxygen in the kiln is such as to cause severe overloading of the dust collector equipment in the so-called baghouse portion of the installation. The provision, use and maintenance of the additional dust collector capacity necessary to accommodate such excessive entrainment of fines constitutes a significant additional capital expenditure and operational and maintenance burden adversely affecting the technical and economic advantages of the overall cement producing operation.

In addition, the kerogen content of the calcareous rock does not burn with the release of effective heat in either the calcining zone of the kiln where limestone decomposes to form CaO or in the burning zone maintained generally at 2,000° to 2,700°F or higher at the end of the kiln at which the fuel and air are injected and from which cement clinker product is removed. Rather the kerogen content of the rock burns at the raw material feed end of the kiln as soon as the feed material enters the kiln. If graphite carbon were present instead of said kerogen material, burning would occur at about 1,600°–1,800°F and the heat of combustion would be useful in driving out the $CO_2$ content of the limestone feed material. The burning of the kerogen at the feed end of the kiln, however, fails to contribute to the efficiency of the rock burning operation. More significantly, the burning of the kerogen results in the heating, expansion and increased volume flow rate of the gases being exhausted at the feed end of the kiln. This not only serves to reduce the effective productive capacity of the kiln, but also causes an excessive entrainment of the fines portion of the kiln feed material being charged at the same end of the kiln, with the accompanying disadvantages and problems referred to above. As an added disadvantage, the automatic water spraying commonly given the exhaust gases leaving the kiln requires the use of additional and sometimes excessive quantities of water when the gases leave the kiln at increased temperatures and flow rates because of the burning of kerogen materials in the kiln. This disadvantage alone is of major consequence in regions in which the available water is in short supply.

In an effort to overcome the major disadvantages preventing the effective use of kerogen-containing calcareous rock deposits, it has been proposed to pass the exhaust gases leaving the kiln at a temperature of about 1,000°F upward through a series of orifice-containing cyclones through which the kiln feed admixture is passed downwardly in transport from the kiln feed silo to the kiln in which the cement clinker is produced. In such embodiments, however, cracking of the hydrocarbon content of the kerogen material results in such coking of the feed material as to choke off or clog the orifices to the point of interrupting normal production activities.

Because of these difficulties, calcareous rock having a kerogen content of more than about 1.5 percent by weight of rock on a hydrocarbon-free basis, frequently about 2 to 3 percent or more, has not been effectively employed in the production of cement clinker and related products. Such rock, as indicated above, has either not been employed at all as kiln feed material or has been used in such limited amounts, i.e., less than about 15 percent of the total calcareous feed material, that the vast majority of such material constituting up to 75 percent or more of the total limestone deposit may be unavailable for cement production operations. This inability to achieve effective utilization of the entire limestone deposit and the resulting rapid rate of depletion of the high calcium rock portion of the deposit become a source of major concern to cement producers necessarily relying upon such high calcium rock in conventional operations and unable to effectively utilize the lower calcium, kerogen-containing rock constituting a major portion of such limestone deposits.

It is an object of the present invention, therefore, to provide an improved process for the production of cement clinker and related products.

It is another object of the invention to provide a process for the production of cement clinker from calcareous rock having an appreciable kerogen content.

It is another object of the invention to provide a process for effectively utilizing the lower calcium, kerogen-containing rock portions of a calcareous deposit in the production of cement clinker and related products.

It is another object of the invention to provide a process for effectively utilizing calcareous limestone deposits containing both high calcium and lower calcium, kerogen-containing rock in the production of cement clinker.

With these and other objects in mind, the invention is hereinafter described in detail, the novel features thereof being particularly pointed out in the appended claims.

SUMMARY OF THE INVENTION

The present invention enables calcareous rock having an appreciable kerogen content to be effectively utilized in the production of cement clinker and related products. Thus, limestone deposits containing up to 75 percent or more of such rock can be effectively utilized in cement operations, whereas heretofore such material was unsuited for this purpose and was either discarded to waste or simply not quarried. In accordance with this invention, the previously unsuited calcareous rock is quarried, crushed, roasted and cooled to form a suitable kiln feed material. The resulting kiln feed material not only has its kerogen hydrocarbon content reduced to tolerable levels, i.e. below 1.5 percent by weight of rock on a kerogen-free basis, but is also beneficiated by the removal of impurity-bearing fines so as to enhance the quality of the treated rock as a kiln feed material.

Roasting of the rock is carried out at a temperature of about 800°–1,600°F in an oxidizing atmosphere to burn the hydrocarbons to $CO_2$ and $H_2O$, while avoiding undesired coking. Beneficiation occurs by the entrainment of impurity-bearing fines in the effluent gases from the roaster and in the cooling air stream used to cool the roasted rock, as well as in the heated stream used to dry the raw rock prior to roasting thereof. The effluent gases from the roaster and heated air from the cooling zone can conveniently be employed to dry additional quantities of raw rock. Further beneficiation results from the entrainment of impurity-bearing fines by the head gas stream passing through the drying zone.

By minimizing the amount of limestone material entrained with the impurity-bearing fines in the various beneficiation aspects of the present invention, the CaO content of the treated rock is enhanced so that said rock approaches or even exceeds the quality of that portion of the rock from such kerogen-containing deposits that contains tolerable amounts of kerogen and does not require processing in accordance with the present invention. Primary crushing with minimum production of limestone fines can readily be accomplished by roll-type crushing, as by means of a single roll crushed, when the raw rock from the quarry comprises interbedded material having thin layers of limestone material separated by thin layers of shale material. By leaving such material along the relatively weak bedding planes between the bands of limestone and shale, the amount of limestone fines can be minimized in the production of material having a nominal three or four-inch size suit-able for the preliminary drying operation.

At roasting temperatures above about 1,000°F, kerogen hydrocarbon removal is facilitated, the kerogen content of the rock being reduced to from about 0.8 to about 1.5 percent. In addition the decomposition of limestone that occurs at such temperatures and the resulting increased presence of free CaO facilitates the trapping of sulfur-containing gases formed during the roasting operations. Sulfur-containing compounds formed by the reaction of such sulfur-containing gases with limestone and free CaO is thus enhanced, further assuring against the undesired discharge of sulfur-containing gases to the atmosphere.

Treated calcareous rock is raw milled with suitable quantities of siliceous and ferriferous material to form ground kiln feed material that can be burned at about 2,000°–2,700°F to decompose the limestone content thereof and form cement clinker solids. The treated calcareous rock can be employed in this manner without causing an excessive entrainment of fines in the kiln exhaust gases and reduced operating capacity of the kiln. Where high calcium rock having tolerable amounts of kerogen contained therein is also available, treated calcareous rock and high calcium rock can both be employed in the calcareous portion of the kiln feed material. In such instances, the treated calcareous limestone rock can conveniently comprise from about 50 percent to about 90 percent by weight of the total calcareous material employed. Effective utilization of both the high calcium rock and the lower calcium bearing kerogen-containing rock in available limestone deposits is thus achieved, and premature exhaustion of the deposit with substantial quantities of rock remaining unused is entirely avoided.

BRIEF DESCRIPTION OF THE DRAWINGS

The invention is hereinafter set forth in further detail with reference to the accompanying drawings in which:

FIG. 1 is a flow diagram showing the production of cement clinker and related products in accordance with the present invention from raw materials including high calcium rock and various grades of lower calcium, kerogen-containing rock quarried from separate sections of a limestone deposit; and FIG. 2 is a more detailed flow diagram of an embodiment of the invention for treating raw kerogen-containing calcareous rock to produce an improved raw milling feed material for use in forming ground kiln feed material.

DETAILED DESCRIPTION OF THE DRAWINGS

In accordance with the present invention, calcareous rock having an appreciable kerogen content is treated to produce a calcareous feed material of enhanced quality for use in cement production operations. As used herein, the term "calcareous rock" is used to indicate raw calcareous rock containing more than about 50 percent by weight of carbonates, including calcium carbonate and magnesium carbonate, on a kerogen-free basis, such as high calcium limestone, argillaceous limestone, such as cement rock, containing considerable clay or shale and, as a result, a relatively high silica and alumina content, and shaly limestone rock containing abundant quantities of clay minerals but nevertheless constituting less than 50 percent by weight of the total rock. It will be understood that the magnesium carbonate content of said calcareous rock will generally be less than about 3 percent since the maximum MgO content permitted in finished Portland cement products is about 5 percent. In addition to silica and alumina, such clay mineral impurities as iron sulfide, sodium and potassium alkali salts, and the like may also be present in the raw calcareous rock. Such rock is thus distinguished from argillaceous rock, such as clay, shale, slag, fly ash and the like, which contain a major proportion of silica, generally with smaller amounts of alumina, iron oxide, magnesium oxide and the like, with generally minor amounts of calcium carbonate. Argillaceous rock may be employed as a source of siliceous and ferriferous material and of alumina in place of or in addition to separate additions of silica and iron to calcareous rock in the production of a kiln feed mixture.

For purposes of the present invention, an appreciable kerogen content is deemed to be more than about 1.5 percent by weight of calcareous rock on a kerogen-free basis, with said appreciable kerogen content generally being from about 2 percent to about 4 percent or more, although rock having lesser or greater amounts of kerogen can also be treated beneficially in accordance with the process of the present invention. Calcareous rock having a kerogen or hydrocarbon content of up to about 1.5 percent by weight can be tolerated in the calcareous portion of the kiln feed material and such rock may be employed as kiln feed material without necessary treatment in accordance with the present invention. Preferably, however, the tolerable kerogen content of the calcareous rock will be less than about 1.25 percent by weight, more preferably, less than about 1 percent by weight. The kerogen content will generally not be reduced in accordance with the present invention to a tolerable level of less than about 0.8 percent by weight because of economic considerations although it will be appreciated that such lower kerogen contents in calcareous rock treated as herein provided would be advantageous and desirable if economic considerations were to permit such further reduction in the kerogen content of the rock.

In kerogen-containing calcareous rock deposits having a high quality rock, referred to herein as "high calcium limestone" or "high calcium rock" in a separate quarry section, such high calcium rock has been found to have kerogen hydrocarbons within the tolerable limits indicated above. Such high quality rock, which thus does not require processing in accordance with the present invention, has been found to have a CaO content of about 45 percent by weight or more, i.e., a calcium carbonate content of from about 84 percent to about 88 percent, with a silica content of about 5–7 percent, an iron oxide and alumina content of about 3–4 percent and a magnesium oxide content of less than 3 percent.

Lower quality calcareous rock existing in separate quarry sections of the kerogen-containing limestone deposit have been found to have a CaO content of about 40 percent by weight or less, and a hydrocarbon content of more than about 1.5 percent, frequently in the range of about 2 percent to about 4 percent or more by weight of rock on a hydrocarbon-free basis. At such kerogen hydrocarbon levels, the lower calcium rock has heretofore been unacceptable as a raw material for cement production operations and is generally not quarried for this purpose.

Such kerogen-containing limestone deposits will commonly contain more than one grade of lower calcium bearing rock in separate quarry sections. As used herein and particularly in the specific examples below, two of such lower calcium bearing quarry sections are referred to for convenience as "high calcium cement rock" and "low calcium cement rock." Each of these materials has a lower calcium oxide content than the high calcium rock referred to above and, more significantly, a kerogen hydrocarbon content in excess of the previously tolerable limits indicated above. It will be appreciated that rock from any number of such lower calcium bearing quarry sections found in an actual deposit can be quarried, stockpiled and treated in accordance with the present invention in cement production and related operations. It will also be understood that high calcium rock containing unacceptable quantities of kerogen can be treated in accordance with the present invention, that lower calcium rock having tolerable amounts of kerogen may be employed as a kiln feed material without such treatment, and that the quality of any calcareous rock treated by the process of the present invention will be enhanced as herein indicated. The present invention also permits the use of weathered rock present on the surface of the calcareous deposit. Such material will also have a CaO content generally less than that of high calcium rock although the kerogen content of the raw rock may be within tolerable limits.

In the utilization of a calcareous deposit, a detailed quarry plan may be worked out in a manner known to those skilled in the art. Since such detailed quarry operations are outside the scope of this invention, no precise information on this aspect of the overall operation is deemed pertinent or necessary in the present application. In general, however, a rotary drill may be used to provide blastholes on a pre-determined pattern, with the quarry sections being worked on convenient benches of varying heights. The weathered rock on the surface can be excavated by a ripper with a single blade tooth mounted on a bulldozer prior to blasting. The quarried stone can be moved by haul trucks to raw material stockpiles near the primary crusher at the feed end of the cement plant.

In order to further describe the present invention, reference is made to the flow diagram of FIG. 1 in which calcareous materials quarried from a limestone deposit are stockpiled as four major raw mix components in stockpiles generally represented by the numeral 1, with 1a representing high calcium rock, 1b representing high calcium cement rock, 1c representing low calcium cement rock, and 1d representing a stockpile of weathered rock. As indicated above, stockpiles 1b and 1c contain appreciable amounts of kerogen contaminants making them unsuitable for use in the production of cement clinker in conventional operations. Consequently, the raw material of stockpiles 1b and 1c frequently has not been quarried and stockpiled for use in cement clinker production, the high calcium rock of stockpile 1a alone being used for this purpose. In addition to the limestone stockpiles, silica is stockpiled as at 1e and gypsum is stored in stockpile 1f.

Raw material from each of the stockpiles is fed to primary crusher 2, such as a single roll unit rated, for example, to produce a nominal 3-inch product, as hereinafter defined, with minimum production of limestone fines. Crushed rock is then conveyed to rotary dryer 3 in which the material is dried by driving off uncombined water or moisture at below about 250°F, for example, at about 220°F. The dried material is then elevated by a suitable belt to vibratory screens 4, which may conveniently comprise a three deck screen. Top and middle deck overs are discharged to secondary crusher 5 set, for example, to produce a ⅜ inch nominal size product, i.e., about 90 percent passing a ⅜ inch screen. The discharge from secondary crusher 5 may be transported, as by conveyor line 6 to rotary roaster 7 or, alternately by conveyor line 6a, to raw mill storage bins represented generally by the numeral 9. Raw materials not containing kerogen materials, or containing such materials in tolerable amounts, i.e., material from stockpiles 1a, 1e and 1f, are conveyed through line 6a to raw mill storage bins 9a, 9e and 9f, respectively. Iron ore used in cement clinker production is stored in storage bin 9g. Weathered rock from stockpile 1d will also generally have a kerogen content within tolerable limits so that such material can be conveyed through bypass line 6a to raw mill storage bin 9d.

Bottom deck overs and throughs from screen 4 may be transported directly to the raw mill storage bins, or alternately, to roaster 7 or to a storage silo for discard to waste. When processing high calcium rock, for example, such bottom deck overs and throughs constitute valuable kiln feed material and, as such, are transported to storage bins 9a by conveyor belt 6 and bypass 6a. Similarly, bottom deck overs and throughs obtained when processing weathered rock will likewise generally constitute valuable kiln feed material that can be transported to storage bin 9d. When processing rock having an appreciable kerogen content, i.e., above about 1.5 percent, such bottom deck overs and throughs may contain such a concentration of impurities as to render these materials unacceptable for use as kiln feed material. In such instances, the bottom deck overs and throughs are discarded to a waste silo. If, on the other hand, the concentration of impurities in such bottom deck overs and throughs is not deemed unacceptable with respect to the particular grade of cement product to be produced, but such material contains an unacceptable level of kerogen, the bottom deck overs and throughs may be passed, together with the discharge from secondary crusher 5, to rotary roaster 7 for treatment as herein provided.

The high cement rock and low cement rock of stockpiles 1b and 1c, respectively, contain sufficient quantities of kerogen as to render these materials unacceptable for use as raw mill feed as it emerges as crushed, dried and sized material from screens 4 and secondary crusher 5. Each of these materials, therefore, are conveyed through line 6 to rotary roaster 7 in which said materials are roasted in an oxygen atmosphere at temperatures of from about 800°F to about 1,600°F to burn sufficient hydrocarbons to reduce the kerogen hydrocarbon content in the roasted rock to the indicated tolerable levels. Under these conditions, the hydrocarbons burn essentially completely to form $CO_2$ and $H_2O$. Under reducing conditions, the main hydrocarbon decomposition process would be cracking thereof, resulting in the formation of an undesirable coke-like residue as well as a light volatile fraction.

Roasted rock from roaster 7 passes through rotary cooler 8 for cooling to some convenient temperature, e.g. around 200°F, prior to passing to suitable conveyor belts or other means for conveyance to storage bins 9. By means of the stream of cooling air passing through cooler 8, an added advantage is obtained in addition to the desired cooling of the roasted material prior to its passing onto the conveyor means. This advantage resides in the entrainment of the fine fraction of the roasted rock, e.g., −20 mesh material, in the cooling air stream. This fine fraction of entrained material is found to contain a substantial amount of alumina, iron sulfide and other impurities accompanying the calcareous rock material. The removal of this fraction, and similar beneficiation that occurs in roaster 7 and dryer 3 as disclosed hereinafter, serves to improve the quality of the roasted rock as a kiln feed material and, at the same time, results in a corresponding increase in the limestone content of the roasted rock. The thus roasted and beneficiated high cement rock and low cement rock are conveyed to raw mill storage bins 9b and 9c, respectively, for admixture with high calcium rock, silica and iron for raw milling prior to burning.

Limestone material from bins 9a, 9b, 9c and 9d, together with silica from bin 9e and iron ore from bin 9g, are proportioned by weigh feeders located under the raw mill storage bins. Material handling means comprising a collecting belt receives the material from the weigh feeders for discharge into a bucket elevator feeding raw mill 10. The raw mill feed ingredients are proportioned so as to provide a cement clinker of suitable quality for the production of good commercial quality Portland cement, masonry cement and similar cement products as well known in the art. While the proportions in which the silica, iron ore and limestone are mixed is not a critical feature of the invention, the calcareous rock treated in accordance with the invention, together with untreated high calcium rock if such is employed to adjust the CaO content of the feed, will generally constitute over 80 percent of the total kiln feed mixture, the ingredients being mixed generally so that the resulting cement clinker will have a nominal analysis of from about 60 to 70% CaO, 15–25% $SiO_2$ and 1–5% $Fe_2O_3$. It will be understood that, in some instances, the desired amounts of silica, iron and alumina will be present in the argillaceous limestone rock employed so that separate amounts of silica and iron need not be blended therewith to produce a suitable kiln feed material. It will also be appreciated that, when silica and iron are to be blended with the calcareous rock to produce the kiln feed material, an argillaceous material, such as a clay or shale containing suitable amounts of siliceous and ferriferous material, may be used in place of separate additions of silica and iron.

The admixture fed to raw mill 10 will generally be on the order of −⅜ inch material, while the finely ground material discharged from the mill will be on the order of about −200 mesh material suitable for cement clinker production. Low pressure pneumatic conveyors and a bucket elevator, not shown, are used to convey mill discharge to an air separator 11 from which coarse material is recycled to raw mill 10. Pneumatic pump 12 is used to transport the fine material from air separator 11 to homogenizing silo 13 from which material overflows into adjacent kiln-feed silo 14. Kiln feed can be discharged from either silo into rotary kiln 15.

The burning end of rotary kiln 15 is maintained at a temperature sufficient to burn the kiln feed ingredients to the point of incipient fusion and cement clinker formation. Temperatures within the general range of from about 2,000°F to about 2,700°F are satisfactory for this purpose although temperatures outside this range can also be employed. The kiln may be direct fired with natural gas, fuel oil or coal. By controlling the fuel/air ratio so as to avoid a large excess of oxygen and the consequent increase in the volume flow rate of air in the kiln, excessive entrainment of material fines in the kiln exhaust gases can be avoided. The exhaust gases exit from the feed end of the kiln at about 1,000°F through dust collectors 16, e.g., multiple cyclone dust collectors and glass bag dust collectors, to induced draft fan 17 and exit through stack 18. Because excessive entrainment of fines can be avoided, overloading of dust collector 16 and consequent operational problems can be avoided in the practice of this invention. In addition, the ability to operate without employing excessively high flow rates, despite the presence of substantial quantities of lower calcium rock in the kiln feed, permits the kiln to be operated at its optimum productivity capacity since the volume of kiln space required for air flow can be minimized. The generation of excessive heat by the decomposition of kerogen hydrocarbons at the feed end of kiln 15 is, of course, avoided since the kerogen content of the calcareous material in the kiln feed is well within limits so that excessive entrainment of fines and reduced kiln capacity are not impediments to the commercial practice of the present invention. Product cement clinker is discharged at the burning zone end of kiln 15 onto a horizontal grate cooler 19 equipped with a conventional clinker breaker 20. Clinker is transported therefrom to storage piles 21 and to clinker storage silo 22 by suitable conveyors and elevator means.

Finished cement products are produced by proportioning clinker from silo 22 and gypsum from gypsum silo 23 for finish milling in finish mill 25. When a masonry cement product is desired, high calcium limestone rock from silo 24 may also be proportioned in the finish milling feed. The finish ground cement product from mill 25 will generally have a size on the order of 95 percent −325 mesh material. Mill 25 operates in closed-circuit with air separator 26 from which fine material passes through cement cooler 27 to cement cooler 27 to cement product storage silos 28, from which the finished cement products are shipped by truck or rail. It will be understood that any of the conventional additives known in the art, such as retarding agents, air-entraining agents, dispersing agents, and the like, may be incorporated in the cement.

Referring now to the embodiment of FIG. 2, raw materials are transported from stockpiles 1a, 1b, 1c, 1d, 1e and 1f, as previously indicated, by loader means represented by the numeral 29 to a Wobbler feeder 30, spaced for example for separation of 3-inch material, which discharges oversize material into primary crusher 2, which is conveniently a single roll unit set to produce a nominal 3-inch product as hereinafter defined. Crushed material and feeder throughs are elevated by means of belt conveyor 31 to surge bin or silo 32 from which material is conveyed by an apron feeder, not shown, and belt conveyor 33 to rotary dryer 3. As shown by bypass line 34, material that is already dry due to atmospheric conditions or other circumstances need not be passed through dryer 3 but may be conveyed by means of belt conveyor 35 to vibratory screens 4 or roaster 7.

At screens 4, such as a three deck screen, top deck overs, e.g. material retained on a 1-inch screen, and middle deck overs, e.g. material passing a 1-inch screen, but retained on a ½-inch screen, may be discharged to secondary crusher 5, i.e., a reversible impactor set, for example, for the production of ⅜-inch material, e.g., about 90 percent passing a ⅜-inch screen, a size on this order of magnitude having been found generally convenient for secondary crushing in such operations. When high calcium rock is being processed, bottom deck overs, e.g., material passing a ¼-inch screen but retained on a ⅛-inch screen, and throughs, e.g., material passing a ⅛-inch screen, together with crusher dust may constitute desirable kiln feed material to be passed to storage bins 9. Crusher discharge may also be recycled to screens 4 as byline 36. Bypass means are provided, however, to move bottom deck overs from the screen to a waste storage silo, not shown, as when lower calcium rock having a substantial amount of impurities concentrated in the finer fractions is being processed. Screen throughs and crusher discharge dust can be moved to the silo, as by a bucket elevator. Dust and discarded fines from the silo is trucked to waste. Calcareous rock to be roasted is passed by belt conveyor 6 to bucket elevator 37 for transport to rotary roaster 7. High and low cement rock and possible weathered rock from stockpiles 1b, 1c and 1d, respectively, are thus passed to roaster 7. High calcium rock having a tolerable kerogen content, together with silica and gypsum from stockpiles 1a, 1e and 1f, respectively, need not be passed through rotary roaster 7 but may be transported by means of bypass belt conveyor 6a directly to their raw mill storage bins, i.e., bins 9a, 9e and 9f, respectively.

Kerogen-containing calcareous rock passing through rotary roaster 7 thereafter passes through rotary cooler 8 before discharge onto belt conveyor 38 for transport to raw mill storage bins 9, i.e., to high cement rock bin 9b, low cement rock bin 9c, and weathered rock bin 9d. The roasted rock is shown as being cooled in cooler 8 by means of ambient air stream 39 passing counter-currently through said cooler 8. Heated air leaving the feed end of rotary cooler 8 can be passed to the feed end of rotary roaster 7 for co-current flow therethrough as a source of secondary air together with primary air stream 41. Effluent gases exiting from the discharge end of roaster 7 may be passed through line 42 to the feed end of rotary dryer 3 to supply the heat necessary to dry additional quantities of calcareous material passing though said dryer 8. In addition, all or a portion of the heated air from cooler 8 may be passed by means of line 43 to dryer 3 together with effluent gases from roaster 7. When such heated gas streams are not available, as when high calcium rock with tolerable amounts of kerogen by-passes roaster 7 and cooler 8, an independent source of heated air 44 or other hot gas stream must be injected into dryer 3 to drive off uncombined water or moisture from the material being dried. The gas exiting from the discharge end of dryer 3 passes through line 45 to bag house 46 for removal of entrained fines prior to passage by means of induced draft fan 47 to stack 18.

On FIG. 1 of the drawings, it will be noted that gypsum storage is indicated in storage bin 9f and in silo 23 and that high calcium rock storage is likewise indicated in storage bin 9a and in silo 24. It will be understood that the flow diagram is presented as a general representation of an embodiment of the process of the present invention and is not intended necessarily as a complete catalogue of all of the mechanical equipment or parts associated with each operation so indicated. Whether separate bins or silos would be employed or whether some other form of storage would be employed for the ingredients of the process would be determined by individual factors influencing the particular design and operation of a given plant.

In the operation of rotary roaster 7, solids roasting temperatures of from about 800°F to about 1,600°F are employed, as measured by thermocouples at the discharge end of the co-currently operated rotary roaster, with solids temperatures of about 1,000°F to about 1,350°F being generally preferred. At the preferred temperature range or above, the kerogen hydrocarbon content of the rock being roasted can be reduced to from about 0.8 percent to about 1.5 percent by weight of the rock on a kerogen-free basis with a residence time in the roasting zone of on the order of one hour. At temperatures below the preferred range, the kerogen hydrocarbon content of the rock can be significantly reduced, i.e., to tolerable levels, but reduction thereof to the more desirable levels, i.e., below 1.25 percent or preferably below 1 percent, are achieved by employing longer roasting residence times, such as on the order of 2-4 hours or more. As indicated above, an oxidizing atmosphere is maintained in the roasting zone to assure that the hydrocarbons in the rock being roasted are burned to form $CO_2$ and $H_2O$ essentially without undesired coking. Such coking will occur under reducing conditions where cracking of the hydrocarbons occurs as in the retorting of oil shales with the formation of a light volatile fraction of condensable and non-condensable material and a heavy "coke-like" residue. In order to assure that the roasting is carried out under oxidizing conditions, it has been found desirable to inject sufficient air into the roaster so as to maintain an excess of oxygen of at least about 2½ percent, as measured by a standard oxygen analyzer in the effluent gas stream withdrawn from the roaster. While up to 10 percent or more excess oxygen as measured in the gas stream from the roaster can be employed, the amount of air injected into the roaster can conveniently be regulated so that less than 5 percent oxygen is measured in said gas stream, with an excess of from about 2½ percent to about 3 percent being generally satisfactory. Such an excess of oxygen so as to assure maintaining oxidizing conditions in the roaster is maintained by regulating the amount of primary air injected into rotary roaster 7, preferably co-currently with the calcareous rock being treated together with secondary air if employed, as from the heated air stream exiting from rotary cooler 8.

The effluent gas stream from the roaster has entrained therein alumina and other impurity-bearing fines accompanying the rock undergoing roasting. As the impurities tend to be concentrated in the finer fraction of the rock material, while the limestone tends to be concentrated in the coarser material, a beneficiation of the roasted rock results, improving the quality of the treated rock not only by the removal of kerogen material therefrom, but by the removal of said impurities and the consequent increase in the CaO content of the roasted calcareous rock.

Prior to discharge of roasted calcareous rock onto belt conveyor 38 for transport to storage bins 9, the rock is cooled, as to about 250°F, in rotary cooler 8. For this purpose, ambient air may be passed through rotary cooler 8 preferably counter-currently with the roasted rock. As the cooling air stream is heated during its passage through cooler 8, it is convenient to employ this heated air stream as a source of secondary air for rotary roaster 7. Alternately, all or a portion of this air stream may be passed to rotary dryer 3 for use in the drying of additional quantities of material being treated as herein provided.

In addition to cooling the roasted rock, the air stream passing through cooler 8 provides an important function in further beneficiating the roasted rock to enhance its quality as a kiln feed material. The desirable function is accomplished by the entrainment of fines present in the roasted rock material passing through rotary cooler 8 in the cooling air stream. The fines thus removed from the roasted rock are found to contain a substantial portion of the alumina content of the clays accompanying the calcareous rock material, as well as sodium and potassium alkali salts and other impurities, which are concentrated in the finer portion material. This feature is a particular significance with respect to lower quality calcareous rock, serving to enhance the quality of such material to the point of approximating or exceeding the quality of high calcium rock, particularly in combination with the other desirable beneficiation that occurs in the treatment of calcareous rock by the process of the present invention as herein described and claimed. It will be appreciated that the fines fraction entrained in the cooling air stream can be controlled by control of the air flow through the rotary cooler and other operating variables. It has been found generally desirable, from an overall viewpoint, to employ a cooling air stream such that fines of a size of about −20 mesh are entrained therein, although the cooler can be operated in such a manner that some other fines fraction level, such as −50 mesh, will be entrained in the air stream and thereby removed from the body of roasted rock passed on to raw mill storage.

Sulfur-bearing impurities contained in the raw calcareous rock, such as iron sulfides, are included in the fines indicated above that are entrained in the effluent gases from the roaster and the heated air from the cooler. In addition, a portion of the sulfur content of the roasted rock reacts during the roasting operation to form sulfur-containing gases, i.e., $SO_2$ and perhaps some $H_2S$. These sulfur-containing gases react with the calcium material in said fines to form additional sulfur-bearing compounds. The $SO_2$ gases will react with limestone material, for example, to form calcium sulfate, particularly when roasting temperatures below 1,000°F are employed. In addition, some calcination of limestone material to CaO will occur in the flame portion of the roaster and in the gas streams in which high temperatures exist. The free CaO thus formed reacts with $SO_2$ gases to form calcium sulfate under oxidizing conditions. Any $H_2S$ gas that is generated also reacts with free CaO to form CaS fines. These reactions between sulfur-containing gases and calcium-bearing material occur in the roaster, the cooler, the gas streams therefrom, and in the dryer and the bag house in which entrained fines are separated from the gas streams prior to discharge of said gas streams to the stack. As result, the sulfur content of the treated rock is significantly reduced without undesired release of sulfur-containing gases to the atmosphere.

At solids roasting temperatures above about 1,000°F, preferably from about 1,000°F to about 1,350°F, the sulfur removal from the roasted rock is enhanced and facilitated by the decomposition of a portion of the limestone material in addition to that which occurs as indicated above. At above about 1,000°F, partial calcination or decomposition of limestone is found to occur, such partial decomposition being accomplished at less than the theoretical decomposition temperature of $CaCO_3$, and being catalyzed by the presence of steam formed by the dewatering of the water of crystallization of accompanying montmorillonitic clays, which promotes breakdown of carbonates. The presence of various impurities in the rock may also have some effect on the decomposition of the limestone that occurs at such temperatures. The additional free CaO thereby formed in the fine fraction of said roasted rock serves to enhance the removal of sulfur from the roasted rock by said generation of sulfur-bearing gases and subsequent reaction thereof with the CaO to form additional sulfurnbearing compounds that are removed from said effluent gases as herein provided. As indicated above, this additional formation of sulfur-containing compounds occurs not only in the roaster, but in the cooler, the dryer, the gas streams and in the bag house. Calcium sulfate not removed in the gas stream from the roaster or the dryer, of course, passes to the raw mill storage bins with the roasted rock. Such material may thereafter be entrained in the gas stream withdrawn from the kiln during cement clinker production. In addition, of course, carrying out the roasting operations at such higher temperatures, that is, above about 1000°F, also enhances the removal of the kerogens from the calcareous rock being roasted.

Effluent gases from roaster 7, alone or together with heated air directly from cooler 8, is passed to rotary dryer 3, preferably for co-current passage therethrough with crushed material from primary crusher 2. The crusher material is heated to a suitable temperature, advantageously from about 220°F to about 250°F, to drive off uncombined water or moisture. If the material being treated is already dry, as in periods of exceptional dryness, provisions are made to bypass dryer 3 as indicated above. During the drying operation, the surface of the rock is heated and abraded, and some dust or fines will be entrained in the gas stream used for drying the crushed solids. As such dust will contain a relatively high proportion of impurities, a further additional beneficiation of the material being treated results. Gases exiting from dryer 3, including or together with effluent gases from roaster 7 and heated air from cooler 8, are passed to bag house 46 for recovery therefrom of the fines entrained therein prior to passage of said gases to stack 18, said fines having alumina, alkali salts and other impurities present in the raw rock concentrated therein. Such fines may be discarded to waste.

The proportion of limestone material in the fines removed from the raw calcareous rock in the process of the process of the present invention is advantageously minimized so as to enhance the degree of beneficiation and the quality of the treated calcareous rock. The amount of limestone material undesirably removed from the calcareous rock by the various beneficiating aspects of the present invention can be minimized by carrying out the initial crushing operation in such a manner as to minimize the production of limestone fines. In the embodiments of the invention disclosed above, and in FIG. 2 of the drawings, a roll crusher is indicated for primary crushing of the raw calcareous rock. Primary or coarse crushing by such roll crushing means can be effectively employed in the processing of raw rock quarried from limestone deposits having relatively thin bands or beds of limestone separated by bands of shale material within particular quarry sections, e.g., within the high cement rock or the low cement rock quarry sections of an overall deposit. In such banded or interbedded quarry sections, thin beds of limestone ranging from about one-eighth inch to about 1 foot in thickness have been found with intermediate shale bands ranging from very minute thickness up to about one inch in thickness, with the average thickness of such bands being about three-eighths inch. In so-called quarry ran material removed from such sections, the material will range from ultra fine to relatively large slabs or plates, such as material of from about 6 inch to 2-3 foot cube. The large slabs of rock are advantageously separated from the smaller material in the quarry run rock as by Wobbler feed 29 spaced, for example, to pass material smaller than 3 inch directly to conveyor 31 and to discharge oversized material to single roll crusher 2. The roll crusher serves to reduce the size of the rock being crushed with minimum production of limestone fines. This desirable result is accomplished by breaking the slabs of rock being crushed along the interbedded shale bands to expose the shale surfaces, thus permitting the shale in such thin bands to be separated from the limestone material upon drying. The shale content, including the various impurities therein, are concentrated in the finer fractions of the rock being processed and are selectively removed in the beneficiation operations of the present invention. By minimizing the production of limestone fines to the extent possible, the amount of limestone material lost during such beneficiation is minimized and the quality of the treated rock as kiln feed material is enhanced.

Roll crushing is feasible with the type of interbedded rock material hereinabove described since such rock is easily fractured by cleaving along the bedding planes between the limestone and shale bands. In other limestone deposits in which such interbedded structure does not exist, the limestone beds may extend to many feet in thickness. In the primary or coarse crushing of material quarried from such a deposit, commercial jaw crushers or gyratory crushers are commonly employed to reduce the raw rock to about 3 ro 4 inches in size during primary crushing prior to drying. Crushing the limestone to sizes on the order of 1 inch is not generally desired because of the increased production of limestone fine produced thereby. In general, crushing by means of jaw crushers or gyratory crushers results in the production of more fines than result from more gently crushing with a roll crusher as is preferably employed when crushing interbedded rock.

In primary crushing by means of jaw crushers or gyratory crushers it is common to refer to the crushed product in terms of a nominal size. Primary crushing is ordinarily employed to reduce the size of raw rock received from the quarry to on the order of 3 or 4 inches. With respect to such crushing operations, a minus 3-inch nominal product, for example, is ordinarily considered as a crushed product 90 percent or about of which is capable of passing a 3-inch screen. Such ratings normally indicate, therefore, that the maximum dimension of the crushed material capable of passing such a screen would be, in the example, three-inches. In the primary crushing of interbedded material with minimum production of limestone fines, however, the term "minus 3-inch nominal product," used herein with respect to the material passing a roll crusher set for 3 inches or the throughs of a Wobbler feeder spaced for 3-inch material, has been used to denote material whose minimum or shortest dimension is 3 inches or less. Thus a slab of such calcareous rock having dimensions of, for example, 1 foot × 1½ feet × 2 inches would be capable of passing with the Wobbler throughs and of passing through a roll crusher set for 3-inches and would, therefore, constitute a 3-inch nominal size product. It has been found that primary crushing of interbedded calcareous rock to about 3 or 4 inches nominal size, as herein described, is particularly advantageous in that the production of limestone fines can be minimized.

The burning and sintering operations in the kiln can be carried out without undesired loss of productive kiln capacity and without the excessive entrainment of fines in the kiln exhaust gases because of the absence of substantial and unacceptable amounts of kerogen in the kiln feed material and the resulting ability to employ lower air/fuel ratios than would be required if the kerogen-containing calcareous rock were not treated in accordance with the present invention. In general, it has been found desirable to employ from about 1¼ percent to about 1¾ percent excess oxygen, whereas significantly larger amounts of excess oxygen, e.g., about twice as much or more, would be required to assure proper burning of injected natural gas fuel and complete burning of decomposed kerogen to $CO_2$ and $H_2O$ without undesired coking. In addition, the amounts of water employed to spray the kiln exhaust gases can also be minimized in this manner, creating a further practical advantage in the operation of the present invention. The absence of intolerable levels of kerogen burning at the feed end of the kiln, with resulting expansion and increased flow rates of the exhaust gases is, of course, a major source of the saving in the quantity of water employed for such spraying purposes.

In the practice of the present invention, interbedded kerogen-containing calcareous rock was excavated from a Niobrara formation of Cretaceous Age and stockpiled as high calcium rock, high cement rock, low cement rock and weathered rock. The high calcium rock and the weathered rock had a tolerable level of kerogen hydrocarbons, whereas the high cement rock and low cement rock had kerogen contents above 1.5 percent, rendering such material unacceptable for use in accordance with conventional practice. The cement rock was found to exist in the form of thin beds of limestone ranging from about one-eighth inch to about 1 foot in thickness, separated by shale bands of up to about 1 inch in thickness, typically about three-eighths inch thick. Complete chemical analyses of the limestone raw materials thus quarried, stockpiled and used were as follows:

| | High Calcium Rock | High Cement Rock | Low Cement Rock |
|---|---|---|---|
| $SiO_2$ | 6.89 | 15.19 | 16.74 |
| Total Fe as $Fe_2O_3$ | 0.91 | 1.38 | 2.80 |
| $Al_2O_3$ | 2.36 | 5.09 | 6.14 |
| CaO | 48.94 | 40.64 | 37.75 |
| MgO | 0.66 | 0.81 | 0.94 |
| Total Sulphur as S | 0.01 | 0.39 | 1.34 |
| Total Phosphorus as P | 0.07 | 0.05 | 0.09 |
| $Na_2O$ | 0.19 | 0.28 | 0.27 |
| $K_2O$ | 0.31 | 0.65 | 0.83 |
| Hydrocarbon | 0.98 | 2.88 | 2.40 |
| Carbonate $CO_2$ | 37.88 | 31.36 | 28.84 |
| Combined Water | 1.22 | 1.54 | 3.12 |
| As Received Moisture | 0.23 | 0.34 | 0.53 |
| TOTAL | 100.65 | 100.60 | 101.79 |

Various size fractions of ripped low cement rock weathered material were segregated by screening and subjected to analysis with the following results on a moisture free basis (dried at 230°F):

| Composite of 2 × 1½" inch and | 1½"×1" | ½"×⅜" | ⅜"×¼" | Dust From −¼" | Dust From 2×1½" | 1½"×1" |
|---|---|---|---|---|---|---|
| $SiO_2$ | 17.62 | 20.02 | 20.39 | 23.72 | 23.77 | 24.48 |
| Total Fe as $Fe_2O_3$ | 1.99 | 1.93 | 2.16 | 2.90 | 3.36 | 4.16 |
| $Al_2O_3$ | 5.83 | 6.98 | 6.91 | 7.86 | 9.18 | 8.56 |
| CaO | 39.00 | 36.73 | 36.39 | 33.00 | 31.80 | 31.44 |
| MgO | 0.47 | 0.49 | 0.58 | 0.60 | 0.60 | 0.57 |
| Total Sulphur as S | 0.021 | 0.029 | 0.014 | 0.015 | 0.013 | 0.034 |
| $Na_2O$ | 0.13 | 0.21 | 0.24 | 0.24 | 0.24 | 0.25 |
| $K_2O$ | 0.70 | 0.91 | 0.95 | 1.10 | 1.08 | 1.10 |
| Hydrocarbon | 1.09 | 1.16 | 1.35 | 1.14 | 1.68 | 1.68 |
| Carbonate $CO_2$ | 30.04 | 28.32 | 27.18 | 24.88 | 23.92 | 23.46 |
| Combined $H_2O$ | 3.35 | 3.41 | 2.76 | 3.04 | 5.61 | 3.89 |
| TOTAL | 100.24 | 100.23 | 98.92 | 98.50 | 101.25 | 99.62 |

Processing of the raw rock was essentially as set forth in the drawings and described above. High calcium rock and weathered rock were subjected to primary crushing in a single roll crusher set for the production of 3-inch nominal size product as defined above. The crushed rock was dried at about 250°F in a rotary dryer having an exit gas temperature of about 550°F. The dried material was elevated by a belt conveyor to a three-deck screen, from which top deck overs, i.e. material larger than 1 inch, and middle deck overs, i.e., material less than 1 inch but over one-half inch, were discharged to a reversible impactor secondary crusher set for the production of a −⅜ inch nominal size product. The crusher discharge, together with bottom deck overs, i.e., material less than one-fourth inch but larger than one-eighth inch, and throughs, i.e., material less than one-eighth inch, from the screen were transported to raw mill storage bins for use in the preparation of kiln feed material.

In the processing of high cement rock and low cement rock, the raw rock was similarly crushed, dried and screened, with bottom deck overs and throughs, together with crusher dust, being passed to a silo for discharge to waste because of the undesirably high concentration of impurities therein. Crusher discharge was transported by a belt conveyor - bucket elevator arrangement to the rotary roaster. Roasting conditions were maintained such that the solids temperature at the discharge end of an approximately 200 ft. co-currently operated, natural gas fired rotary roaster, as measured by thermocouples, was about 800°F to about 1,600°F, typically from about 950°–1,000°F to about 1,350°F, with optimum operation at a solids temperature of about 1,300°F. Gas temperatures in the roaster were maintained at from about 850°F to about 1,830°F, usually at from 1,400°F to about 1,800°F, by thermocouple measurement 65 feet from the firing or burner end of the kiln, with an optimum temperature of about 1,600°–1,650°F. At 145 feet from the burner end, the gas temperature ranged from about 950°F to about 1,750°F, usually within the range of 1,350°–1,700°F, with optimum operation at about 1,500°–1,600°F. At about 200 feet from the burner, i.e., at the discharge end of the kiln, gas temperatures were within the range of 1,100°–1,750°F, usually 1,250°–1,700°F, with an optimum range of about 1,475°–1,550°F. The kerogen hydrocarbon content of the roasted rock was significantly reduced, i.e., to tolerable levels below about 1.5 percent, with the kerogen range of material roasted at above about 1,000°F being generally in the range of 0.8 to 1.5 percent by weight of rock on a kerogen-free basis, preferably below 1.25 percent.

The primary air injected into the rotary kiln co-currently with the rock material was supplemented by secondary air comprising at least a portion of the air used to cool the roasted rock. The total amount of air injected into the roaster was such that at least about 2½ percent, preferably 2½–3 percent oxygen was maintained in the effluent gas stream from the roaster to assure that oxidizing conditions prevailed during the roasting operation. Effluent gases from the roaster were recycled to the dryer to supply the heat for drying additional quantities of calcareous rock. If desired, at least a portion of the heated air from the cooling zone could be passed directly to the dryer for this purpose rather than being passed to the roaster as a source of secondary air. Roasted rock having its kerogen content reduced to tolerable levels was passed through a rotary cooler prior to discharge at about 200°F onto a belt conveyor for transport to storage.

It was found that impurity-bearing fines containing minimum amounts of limestone were entrained in the cooling air stream, e.g., −20 mesh material, and in the effluent gases from the roaster and the exit gases from the dryer, the cooling air and the roaster effluent gases having been passed through the dryer as indicated above. The exit gas temperature of the dryer was maintained at about 550°F. If the exit gas temperature exceeded this temperature, cooling spray water or cool air was injected into said exit gas stream between the dryer and the bag house to assure that gas temperatures injurious to the bag-type fines removal equipment was avoided. Upon removal of the fines having desired impurities concentrated therein, the exit gas was passed to the stack for discharge to the atmosphere.

As a result of the concentration of alumina, iron sulfide, alkali and other impurities in the finer fractions removed from the treated calcareous rock, an increase in the CaO content of the treated rock of generally about 3 percent of more was achieved, the increase being enhanced by the minimum production and loss of limestone fines as herein provided. In addition, of course, the reduction of the kerogen content of the treated rock to a tolerable level, generally from about 0.8 percent to about 1.5 percent by weight of rock on a kerogen-free basis, resulted in a further increase in the CaO content. The quality of the calcareous rock treated in accordance with the present invention, therefore, is thus appreciably enhanced to the point of approaching or exceeding the quality of high calcium rock processed as indicated above.

Kerogen removal was enhanced by operating at solids roasting temperatures above 1,000°F, preferably from about 1,000°F to about 1,350°F, the kerogen hydrocarbon content of the roasted rock being from about 0.8 percent to about 1.5 percent, preferably less than about 1.25 percent by weight of rock in a kerogen free-basis. In addition, the removal of sulfur from the rock being treated was facilitated at roasting temperatures above 1,000°F. At such temperatures, a portion of the limestone was found to decompose to CaO, the additional free CaO serving to enhance the trapping of sulfur-containing gases, principally $SO_2$, with the formation of calcium sulfate and some CaS under oxidizing conditions. The reaction between sulfur-containing gases and limestone or free CaO was found to occur, not only in the roaster, but in the cooler, the dryer, the various duct work and in the bag house, with the increased presence of CaO serving to facilitate such reaction and thereby assuring against any undesired release of sulfur-containing gas to the atmosphere. The sulfur compounds thus formed at various points throughout the system as noted are, of course, removed with the impurity-laden fines in the bag house prior to passing the effluent gases to the stack for discharge to the atmosphere.

Limestone materials treated as indicated above were proportioned with silica and iron ore for raw milling and were milled to produce kiln feed material comprising about 85–90 percent −200 mesh material. The roasted high cement rock and low cement rock were employed in such kiln feed materials in amounts in excess of 50 percent of the total calcareous rock portion of the kiln feed. Such lower calcium rock, previously restricted in use to not more than about 15 percent of the total calcareous material employed in said kiln feed, was generally used to advantage in amounts conveniently ranging from about 75 to 85 percent of the calcareous feed material. The high calcium rock, which in accordance with previous practice, was employed for at least 85 percent or more of the total calcareous kiln feed material, was employed in a correspondingly smaller amount, conveniently from about 15 percent to about 25 percent of the calcareous portion of the kiln feed.

Sintering of the kiln feed ingredients, typically comprising about 80% $CaCO_3$ and 20 percent of $SiO_2$ and $Fe_2O_3$, and production of cement clinker was accomplished in a rotary kiln fired by natural gas at from about 2,000°F to about 2,700°F. The fuel/air ratio was such that about 1¼ to 1¾% excess oxygen was maintained in the kiln. The kiln dust collection system consisted of a multiple cyclone followed by a glass-bag dust collector. No excessive entrainment of fines and consequent overloading of the dust collection system was found to occur during continued operations at the normal productive capacity of the kiln. The cement clinker produced was found to be of high commercial quality. Clinker, gypsum and high calcium limestone were subjected to finish grinding as shown in FIG. 1 to produce commercial grade cement products.

While the invention contemplated the burning of fuel fired into a suitable commercially available kiln, typically a rotary kiln, as the source of essentially all of the heat required for the decomposition of limestone and the desired sintering operation, it is within the scope of the invention to employ raw material ingredients containing materials having an effective heating value when burned in the kiln. If the rock were to contain graphite carbon burning at about 1,600°–1,800°F, for example, the burning of this material would occur primarily in the calcination zone of the kiln where the limestone decomposes to CaO. The presence of such combustible material tends to reduce the overall heat requirements for the clinker production operation. Similarly, combustible materials that are present in the source materials for the silica, iron and other components of the product clinker may also be effective in reducing the overall heat requirements of the kiln without creating the adverse conditions that preclude the presence of substantial quantities of kerogen-type hydrocarbons in the kiln feed material.

In the utilization of kerogen-containing limestone deposits in the production of cement clinker and related products, the present invention permits the full and effective utilization of the entire deposit, including both high calcium and lower calcium, kerogen-containing calcareous rock, whereas up to 65-70 percent of the entire deposit was heretofore wasted because of its being unsuited for use in conventional cement production operations, essentially all of the deposit can now be utilized. Premature depletion of a deposit because of exhaustion of the high calcium rock portions thereof is thus avoided. The present invention accomplishes this highly desirable result while permitting optimum operating capacity of the kiln, effective and efficient operation of necessary dust collection equipment and such practical additional advantages as reduced demand for kiln gas spray water, enhanced quality of calcareous feed material because of the advantageous beneficiation of the treated rock, and the like. All of these features combine to render the novel process of the present invention an important and highly significant advance in the field of cement production and the related utilization of available but not unlimited reserves.

While the invention has been described herein with reference to certain specific embodiments thereof, it will be appreciated that various changes and modifications can be made therein without departing from the scope of the invention as set forth in the appended claims.

Therefore, we claim:

1. A process for the treatment of raw kerogen-containing calcareous rock to render suitable for use in the production of cement clinker comprising:
   a. crushing said raw calcareous rock having a kerogen-content of more than about 1.5 percent by weight of rock on a kerogen-free basis;
   b. roasting said crushed rock in a roasting zone at a solids temperature of from about 800°F to about 1,600°F in an oxidizing atmosphere so as to burn the kerogen-content thereof, forming the evolving $CO_2$ and $H_2O$ from said rock, the effluent gases from said roasting zone having impurity-bearing fines entrained therein, said kerogen-content of the rock being reduced to less than about 1.5 percent by weight; and
   c. cooling said roasting rock by contact with a stream of air in a cooling zone, said cooling air stream serving to entrain and move additional impurity-bearing fines from said roasted rock, whereby the kerogen-content of the raw rock is reduced to tolerable levels essentially without undesired coking thereof, and the amount of alumina, alkali and other impurities in said rock is significantly reduced, thereby enhancing the quality of the treated calcareous rock as feed material in the production of cement clinker and related products.

2. The process of claim 1 in which said kerogen-content of the raw rock is from about 2 percent to about 4 percent by weight.

3. The process of claim 1 in which an excess of oxygen of at least about 2½ percent is maintained in the effluent gas stream from the roasting zone to assure the maintaining of oxidizing conditions in said roasting zone.

4. The process of claim 1 and including drying said crushed rock in a drying zone by contact with a heated gas stream prior to roasting thereof, said gas stream entraining additional fines containing alumina and other impurities, thereby enhancing the quality of the remaining calcareous rock.

5. The process of claim 4 in which said heated gas stream comprises effluent gases from said roasting zone.

6. The process of claim 5 in which at least a portion of said heated air is passed to said roasting zone for roasting said raw calcareous rock, the effluent gases from said drying zone, roasting zone and cooling zone containing fines having a relatively high proportion of alumina, alkali and other impurities, and including removing said fines from said effluent gases in a fines removal zone prior to discharge thereof to the atmosphere.

7. The process of claim 6 in which said calcareous rock contains sulfur-bearing impurities, the fines entrained in said effluent gases from the roasting zone and said heated air from the cooling zone thereby containing sulfur-bearing impurities, a portion of the sulfur content of said roasting rock forming sulfur-containing gases, the calcium-bearing content of said fines reacting with said sulfur-containing gases in the roasting zone, the cooling zone, the drying zone, the gas streams therefrom, and in the fines removal zone to form additional sulfur-bearing compounds removable with said fines, whereby the sulfur content of said rock is significantly reduced without undesired release of sulfur-containing gases to the atmosphere.

8. The process of claim 7 in which said roasting temperature is from about 1,000°F t about 1,600°F, said kerogen-content being reduced to from about 0.8 percent to about 1.5 percent by weight of rock on a kerogen-free basis, whereby decomposition of a portion of the limestone content of said rock is facilitated, the additional free CaO material resulting thereby serving to enhance the removal of sulfur from the roasted rock by said generation of sulfur-containing gases and the subsequent reaction thereof with said CaO to form additional sulfur-bearing compounds, said compounds being removed from the effluent gas stream with said impurity-bearing fines.

9. The process of claim 8 in which the kerogen-content of said raw calcareous rock is from about 2 percent to about 4 percent by weight, said roasting temperature being from about 1,000°F to about 1,350°F.

10. The process of claim 1 and including raw milling said roasted limestone rock material, together with siliceous material and ferriferous material to form ground kiln feed material and burning said kiln feed material in a kiln at a temperature of from about 2,000°F to about 2,700°F to decompose the limestone content of said material and to form cement clinker.

11. The process of claim 10 and including mixing ground calcareous rock having a kerogen-content of less than about 1.5 percent by weight in said ground kiln feed material, said roasted calcareous rock comprising at least about 50 percent by weight of the total amount of calcareous material employed in said kiln feed material.

12. The process of claim 11 in which said roasted rock comprises from about 60 percent to about 90 percent of the total calcareous material in said kiln feed.

13. A process for the treatment of raw kerogen-containing calcareous rock to render suitable for use in production of cement clinker comprising:
   a. subjecting said raw calcareous rock having a kerogen-content or more than about 1.5 percent by weight of rock on a kerogen-free basis to primary crushing;
   b. screening said rock to separate a fine fraction having impurities concentrated therein from said raw rock;
   c. subjecting said raw rock to secondary crushing;
   d. roasting said raw crushed rock in a roasting zone at a solids temperature of from about 800°F to about 1,600°F in an oxidizing atmosphere so as to burn the kerogen hydrocarbon content thereof, forming and evolving $CO_2$ and $H_2O$ from said rock, the effluent gases from said roasting zone having impurity-bearing fines entrained therein, said kerogen content of the rock being reduced to less than about 1.5 percent by weight; and
   e. cooling said roasted rock by contact with a stream of air in a cooling zone, said cooling air stream serving to entrain and remove additional impurity-bearing fines from said roasted rock,
whereby the kerogen-content of the raw rock is reduced to tolerable levels essentially without undersired coking thereof, and the amount of alumina, alkali and other impurities in said rock is significantly reduced, thereby enhancing the quality of the treated calcareous rock as feed material in the production of cement clinker and related products.

14. The process of claim 13 in which said raw rock comprises interbedded rock having thin beds of limestone separated by thin shale bands and in which said primary crushing comprises cleaving the raw rock along the bedding planes between said limestone and shale so as to reduce the size of the raw rock with minimum production of limestone fines,
whereby the quality of the treated rock is further enhanced by minimizing the loss of limestone material with the impurity-bearing fines removed from said treated rock.

15. The process of claim 14 in which said roasting temperature is at least about 1,000°F, said kerogen-content of the roasted rock being reduced to from about 0.8 percent to about 1.5 percent by weight.

16. The process of claim 15 in which said roasting temperature is from about 1,000°F to about 1,350°F, the kerogen-content of said raw rock being from about 2 percent to about 4 percent by weight of rock on a kerogen-free basis.

17. The process of claim 15 and including drying said raw rock in a drying zone after primary crushing thereof by contact with a heated gas stream, said gas stream entraining additional fines containing alumina and other impurities, thereby further enhancing the quality of the calcareous rock being treated.

18. The process of claim 17 in which said heated gas stream comprises effluent gases from the roasting zone.

19. The process of claim 18 and including removing fines entrained in said effluent gases from the drying zone, the roasting zone and the colling zone in a fines removal zone prior to discharge of said gases to the atmosphere.

20. The process of claim 19 in which at least a portion of the heated air from the cooling zone is passed to said roasting zone for roasting said raw calcareous rock.

21. The process of claim 19 in which said calcareous rock contains sulfur-bearing impurities, the fines entrained in said effluent gases from the roasting zone and said heated air from the cooling zone thereby containing sulfur-bearing impurities, a portion of the sulfur content of said fines reacting with said sulfur-containing gases in the roasting zone, the cooling zone, the drying zone, the gas streams therefrom and in the fines removal zone to form additional sulfur-bearing compounds removable with said fines, whereby the sulfur-content of the rock is significantly reduced without undesired release of sulfur-containing gases to the atmosphere.

22. The process of claim 21 in which said roasting temperature is from about 1,000°F to about 1,350°F, an excess of oxygen of at least about 2½ percent by weight is maintained in the effluent gas stream from the roasting zone to assure the maintaining of oxidizing conditions said roasting zone.

23. The process of claim 22 and including raw milling said roasted limestone material, together with siliceous and ferriferous material, to form ground kiln feed material, and burning said kiln feed material at from about 2,000°F to about 2,700°F to decompose the limestone content of said material and to form cement clinker.

24. The process of claim 23 and including mixing ground calcareous rock having a kerogen-content of less than about 1.5 percent by weight in said ground kiln feed material, said roasted calcareous rock comprising at least about 50 percent by weight of the total amount of calcareous material employed in said kiln feed material.

25. The process of claim 14 in which said interbedded rock comprises limestone beds having a thickness of from about one-eighth inch to about 1 foot separated by shale bands having a thickness of up to about 1 inch.

26. The process of claim 18 and including roasting at least a portion of the fine fraction separated from said raw rock after primary crushing together with said raw rock subjected to secondary crushing, whereby said fine fraction or a portion thereof can be utilized in the production cement clinker when the impurity content thereof is tolerable in the production of said kiln feed material.

27. An improved process for the production of cement clinker from limestone deposits containing, in separate quarry sections, calcareous rock having tolerable amounts of kerogen and lower quality rock having an appreciable kerogen content rendering said lower quality rock unsuited as a kiln feed material comprising:
   a. quarrying said lower quality rock from said deposit, said rock having a kerogen hydrocarbon content of more than about 1.5 percent by weight of rock on a kerogen-free basis;
   b. subjecting said rock to primary and secondary crushing;
   c. roasting said crushed rock in a roasting zone at a solids temperature of from about 800°F to about 1,600°F in an oxidizing atmosphere so as to burn the kerogen content thereof, forming and evolving $CO_2$ and $H_2O$ from said rock, the effluent gases from said roasting zone having impurity-bearing fines entrained therein, said kerogen-content of the rock being reduced to less than about 1.5 percent by weight;

d. cooling said roasted rock by contact with a stream of air in a cooling zone, said cooling air stream serving to entrain and remove additional impurity-bearing fines from said roasted rock;

e. milling and roasting rock with crushed rock having a kerogen-content of less than about 1.5 percent by weight quarried from said deposit to form ground calcareous kiln feed material, said roasted rock comprising at least about 50 percent by weight of the total amount of calcareous rock material employed in said ground kiln feed material, whereby essentially all of the kerogen-containing limestone deposit, including calcareous rock having an appreciable kerogen-content as well as rock having tolerable amounts of kerogen, is effectively utilized in the production of kiln feed material, the kerogen-content of the roasted rock being reduced to tolerable levels without undesired coking and the amount of impurities being significantly reduced so as to enhance the quality of said rock as calcareous kiln feed material for the production of cement clinker and related products.

28. The process of claim 27 in which said roasted rock comprises from about 60 percent to about 90 percent of the total calcareous rock employed in said kiln feed.

29. The process of claim 27 and including drying said calcareous rock by contact with a heated gas stream in a drying zone prior to secondary crushing of said rock, said gas stream entraining additional fines containing alumina and other impurities, thereby further enhancing the quality of the remaining rock material.

30. The process of claim 29 in which said heated gas stream comprises effluent gases from said roasting zone.

31. The process of claim 30 in which said roasting temperature is from about 1,000°F to about 1,600°F, the kerogen-content of the roasted rock being reduced to from about 0.8 percent to about 1.5 percent by weight.

32. The process of claim 31 in which the roasting temperature is in the range of from about 1,000°F to about 1,350°F.

33. The process of claim 32 in which the kerogen-content of the raw rock being roasted is from about 2 percent to about 4 percent by weight.

34. The process of claim 29 and including screening said rock after drying to separate a fine fraction having impurities concentrated therein prior to secondary crushing of said rock.

35. The process of claim 29 in which said calcareous rock being roasted contains sulfur-bearing impurities, the fines entrained in the effluent gases from the roasting zone and said heated air from the cooling zone thereby containing sulfur-bearing impurities, a portion of the sulfur content of the roasted rock forming sulfur-containing gases, the calcium-bearing content of said fines reacting with said sulfur-containing gases in the roasting zone, the cooling zone, the drying zone, to gas streams therefrom, and in a fines removal zone to form additional sulfur-bearing compounds, and including the removal of said fines and said sulfur-bearing compounds in said fines removal zone without undesired release of sulfur-containing gases to the atmosphere.

36. The process of claim 35 in which said roasting temperature is from about 1,000°F to about 1,600°F, said kerogen-free being reduced to about 0.8 to about 1.5 percent by weight of rock on a kerogen-free basis, whereby decomposition of a portion of the limestone content of the rock is facilitated, the additional free CaO material resulting thereby serving to enhance the removal of sulfur from the roasted rock by said generation of sulfur-containing gases and the subsequent reaction thereof with said CaO to form additional sulfur-bearing compounds, said compounds being removed from the effluent gas stream with said impurity-bearing fines.

37. The process of claim 36 in which said roasting temperature is from about 1,000°F to about 1,350°F.

38. The process of claim 36 in which said heated gas stream comprises effluent gases from said roasting zone, at least a portion of said cooling air stream from the cooling zone being passed to the roasting zone as a source of secondary air for the roasting of said rock.

39. The process of claim 30 in which said raw rock comprises interbedded rock having thin bands of shale and in which said primary crushing comprises cleaving the raw rock along the bedding planes between said limestone and shale so as to reduce the size of said raw rock with minimum production of limestone fines, whereby the amount of limestone lost with impurity-bearing fines is minimized.

40. The process of claim 39 and including screening said rock after drying thereof to separate a fine fraction having impurities concentrated therein prior to secondary crushing of said rock.

41. The process of claim 40 in which at least a portion of said separated fine fraction is roasted together with raw rock subjected to secondary crushing.

42. The process of claim 40 in which said roasting temperature is from about 1,000°F to about 1,350°F.

43. The process of claim 32 in which the milling of said roasted rock and said crushed rock is carried out with sufficient siliceous and ferriferous material for the production of cement clinker and related cement products and including burning said kiln feed material at a temperature of from about 2,000°F to about 2,700°F to decompose the limestone content thereof and to form cement clinker.

44. The process of claim 40 in which sufficient siliceous and ferriferous material is contained in said kiln feed material for the production of cement clinker and related products and including burning said kiln feed material at a temperature of from about 2,000°F to about 2,700°F to decompose the limestone content thereof and to form cement clinker.

45. The process of claim 43 and including finish grinding said cement clinker and gypsum to form product cement.

46. The process of claim 45 and including an additional quantity of high calcium rock in said finish grinding admixture to produce masonry cement product.

47. A process for the treatment of raw kerogen-containing calcareous rock containing sulfur bearing impurities for the production of cement clinker comprising:

a. crushing the raw calcareous rock having a kerogen-content of more than about 1.5 percent by weight of rock on a kerogen-free basis;
b. roasting said rock in a roasting zone at a solid temperature of about 800°F. to about 1,600°F. in an oxidizing atmosphere so as to burn the kerogen-content thereof, forming and evolving $CO_2$ and $H_2O$ and sulfur-containing gases from said rock, said kerogen-content of the rock being reduced to less than about 1.5 percent by weight, the effluent gases from said zone having impurity-bearing fines entrained therein, said fines including compounds of calcium;
c. passing a stream of air into contact with said roasted rock in a cooling zone, the conditions in the cooling zone being maintained such that there are evolved additional sulfur-containing gases and impurity bearing fines including fines containing compounds of calcium, which are swept from said cooling zone by said air stream;
c. passing the effluent gases from said roasting and cooling zones through suitable passages to a separation zone, at least some of said sulfur-containing gases reacting with the calcium containing fines during said passage to form solid compounds of calcium and sulfur; and
e. separating said impurity-bearing fines and solid compounds of sulfur and calcium from said effluent gas streams, whereby the sulfur level and other impurities in the roasted rock are significantly reduced while avoiding the undesirable release of sulfur gases to the atmosphere and whereby the kerogen content of the raw rock is reduced to tolerable levels.

* * * * *

UNITED STATES PATENT OFFICE
CERTIFICATE OF CORRECTION

Patent No. 3,716,387                        Dated Feb. 13, 1973

Inventor(s) Kenneth D. Simmons et al

It is certified that error appears in the above-identified patent and that said Letters Patent are hereby corrected as shown below:

In the heading of the patent, after the list of inventors, please add:
-- Assignee: Martin Marietta Corporation, New York, N.Y. --.

First page of patent in Abstract:
In second column, lines 22 and 23, change "temperature" to -- temperatures --.

In Column 2, line 28, change "be" to -- in --.

In Column 4, line 53, change "the" to -- this --.

In Column 5, line 20, change "crushed" to -- crusher --; line 23, change "leaving" to -- cleaving --; line 27, change "suit-able" to -- suitable --.

In Column 6, line 26, change "shaly" to -- shale --.

In Column 12, line 1, change "possible" to -- possibly --.

In Column 14, line 1, change "a" to -- of --.

In Column 15, line 2, change "sulfurnbearing" to -- sulfur-bearing --; line 21, change "crusher" to -- crushed --; lines 40 and 41, delete "of the process".

In Column 16, line 4, change "feed" to -- feeder --; line 32, change "ro" to -- or --; line 49, after "product" insert a comma (,); line 58, change "3 inches" to -- 3-inches --; line 60, change "3 inches" to -- three-inches --.

Page 1

UNITED STATES PATENT OFFICE
CERTIFICATE OF CORRECTION

Patent No. 3,716,387               Dated Feb. 13, 1973

Inventor(s) Kenneth D. Simmons et al

It is certified that error appears in the above-identified patent and that said Letters Patent are hereby corrected as shown below:

In Column 17, lines 67 and 68, first heading for table which continues into next column (Column 18) change "Composite of 2 X 1 1/2" inch and" to -- Composite of 2" x 1-1/2" and --.

In Column 18, line 1, 6th column heading, change "2X 1 1/2" to -- 2" x 1-1/2" --; same line, 7th column heading, change " 1 1/2X 1" " to -- 1-1/2"x 1" --; line 57, change "1,350°-1" to -- 1350°- --; line 58, change ",700°F," to -- 1,700°F, --.

In Column 19, line 32, "desired" should be changed to -- undesired --; line 39, change "of" to -- or --.

In Column 21, line 6, after "rock" change the comma (,) to a period (.); same line, change "whereas" to -- Whereas --; line 43, change "the" (second occurrence) to -- and --; line 49, change "roasting" to -- roasted --.

In Column 22, line 24, change "roasting" to -- roasted --; line 35, change "t" to -- to --.

In Column 23, line 2, after "in" insert -- the --; line 64, change "colling" to -- cooling --.

In Column 24, line 22, after "conditions" insert -- in --; line 48, after "production" insert -- of --.

In Column 25, line 10, change "and roasting" to -- said roasted --; line 68, change "to" to -- the --.

Page 2

UNITED STATES PATENT OFFICE
CERTIFICATE OF CORRECTION

Patent No. 3,716,387  Dated Feb. 13, 1973

Inventor(s) Kenneth D. Simmons et al

It is certified that error appears in the above-identified patent and that said Letters Patent are hereby corrected as shown below:

In Column 26, line 8, change "kerogen-free" to -- kerogen-content --; line 33, before "impurity-" insert -- the --.

In Column 28, line 3, change "c." to -- d. --.

Signed and sealed this 27th day of November 1973.

(SEAL)
Attest:

EDWARD M. FLETCHER, JR.
Attesting Officer

RENE D. TEGTMEYER
Acting Commissioner of Patents

Page 3